United States Patent
Pitts et al.

(10) Patent No.: US 11,861,294 B2
(45) Date of Patent: *Jan. 2, 2024

(54) SYNDICATION OF ASSOCIATIONS RELATING DATA AND METADATA

(71) Applicant: Embarcadero Technologies, Inc., Austin, TX (US)

(72) Inventors: James B. Pitts, Aptos, CA (US); Michael L. Swindell, Aptos, CA (US)

(73) Assignee: Embarcadero Technologies, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,938

(22) Filed: Mar. 5, 2021

(65) Prior Publication Data
US 2021/0192123 A1    Jun. 24, 2021

Related U.S. Application Data

(63) Continuation of application No. 15/885,603, filed on Jan. 31, 2018, now Pat. No. 10,943,057, which is a continuation of application No. 14/023,080, filed on Sep. 10, 2013, now Pat. No. 9,916,289.

(51) Int. Cl.
*G06F 17/00* (2019.01)
*G06F 40/134* (2020.01)
*G06F 40/169* (2020.01)

(52) U.S. Cl.
CPC .......... *G06F 40/134* (2020.01); *G06F 40/169* (2020.01)

(58) Field of Classification Search
CPC .............................. G06F 40/134; G06F 40/169
USPC .......................................................... 715/205
See application file for complete search history.

(56) References Cited

U.S. PATENT DOCUMENTS

| | | | |
|---|---|---|---|
| 6,658,623 B1 | 12/2003 | Schilit et al. | |
| 6,735,593 B1 | 5/2004 | Williams | |
| 7,043,471 B2 * | 5/2006 | Cheung | G06Q 30/02 |
| 7,051,038 B1 * | 5/2006 | Yeh | G06F 16/27 |
| | | | 707/999.102 |
| 7,065,500 B2 * | 6/2006 | Singh | G06Q 10/087 |
| | | | 705/26.1 |
| 7,093,012 B2 * | 8/2006 | Olstad | G06F 16/951 |
| | | | 709/224 |

(Continued)

OTHER PUBLICATIONS

Rehman, Building a Data Warehouse for Twitter Stream Exploration, 2012 IEEE/ACM International Conference on Advances in Social Networks Analysis and Mining, 2012 (Year: 2012).*

*Primary Examiner* — Stephen S Hong
*Assistant Examiner* — Matthew J Ludwig

(57) ABSTRACT

In a method for passively relating data to metadata, associations that relate data in a first database to metadata in a second database are received, wherein an association links the data to the metadata, wherein the data is for use in a software application, and wherein the associations are created automatically without user interaction. A visual clue is displayed in a graphical interface of the software application, wherein the visual clue corresponds to a visual representation of the data, and wherein the visual clue is created based on the metadata and the associations. The metadata corresponding to the visual clue is searched for in response to detecting a user interaction with the visual clue. A first portion of the metadata related to the data is displayed.

16 Claims, 6 Drawing Sheets

(56) References Cited

U.S. PATENT DOCUMENTS

| | | | |
|---|---|---|---|
| 7,174,345 B2 | 2/2007 | Malaney et al. | |
| 7,603,294 B2 * | 10/2009 | Singh | G06Q 10/087 |
| | | | 705/14.71 |
| 7,636,890 B2 | 12/2009 | Marcjan et al. | |
| 8,140,566 B2 * | 3/2012 | Boerries | G06F 16/9535 |
| | | | 707/769 |
| 8,224,756 B2 | 7/2012 | Roberts et al. | |
| 8,326,684 B1 | 12/2012 | Halahmi et al. | |
| 8,689,143 B2 * | 4/2014 | Paley | G06F 16/23 |
| | | | 715/849 |
| 8,712,317 B2 | 4/2014 | Cloud et al. | |
| 8,762,132 B2 * | 6/2014 | Tsuchida | G06F 40/40 |
| | | | 704/9 |
| 8,769,417 B1 * | 7/2014 | Robinson | G06F 16/9535 |
| | | | 715/764 |
| 9,679,054 B2 | 6/2017 | Lin et al. | |
| 9,684,732 B2 | 6/2017 | Ma et al. | |
| 9,721,013 B2 | 8/2017 | Margalit | |
| 10,685,032 B2 | 6/2020 | Hopkins et al. | |
| 11,232,481 B2 * | 1/2022 | Lockhart | G06F 40/106 |
| 11,272,020 B2 * | 3/2022 | Rosen | G06Q 30/0267 |
| 2004/0243618 A1 | 12/2004 | Malaney et al. | |
| 2005/0108630 A1 * | 5/2005 | Wasson | G06F 16/313 |
| | | | 715/230 |
| 2005/0239551 A1 * | 10/2005 | Griswold | A63F 13/332 |
| | | | 463/42 |
| 2005/0256842 A1 | 11/2005 | Marcjan et al. | |
| 2007/0067297 A1 * | 3/2007 | Kublickis | G06Q 20/29 |
| 2007/0156653 A1 * | 7/2007 | Garg | G06F 16/9554 |
| 2009/0150806 A1 | 6/2009 | Evje et al. | |
| 2009/0222717 A1 * | 9/2009 | Nelson | G06F 16/9566 |
| | | | 715/207 |
| 2010/0082610 A1 | 4/2010 | Anick et al. | |
| 2010/0241968 A1 | 9/2010 | Tarara et al. | |
| 2011/0173214 A1 | 7/2011 | Karim | |
| 2011/0191321 A1 | 8/2011 | Gade et al. | |
| 2011/0231454 A1 | 9/2011 | Mack | |
| 2012/0150888 A1 * | 6/2012 | Hyatt | G06F 16/335 |
| | | | 707/758 |
| 2012/0317136 A1 * | 12/2012 | Papish | G06F 16/9535 |
| | | | 707/769 |
| 2013/0232399 A1 | 9/2013 | Anick et al. | |
| 2014/0255003 A1 * | 9/2014 | Abramson | H04N 9/8715 |
| | | | 386/240 |
| 2016/0188686 A1 | 6/2016 | Hopkins et al. | |
| 2018/0157626 A1 | 6/2018 | Pitts et al. | |

* cited by examiner

Process
300

ASSOCIATIONS ARE CREATED, AT A FIRST COMPUTER SYSTEM, THAT RELATE DATA IN A FIRST DATABASE TO METADATA IN A SECOND DATABASE.
302

THE ASSOCIATIONS ARE SYNDICATED AT THE COMPUTER SYSTEM TO A FIRST SOFTWARE APPLICATION ASSOCIATED WITH THE DATA.
304

THE SYNDICATING TO CAUSE THE FIRST SOFTWARE APPLICATION EXECUTING AT A SECOND COMPUTER SYSTEM TO DISPLAY A VISUAL CLUE TO A USER IN A GRAPHICAL INTERFACE ASSOCIATED WITH THE FIRST SOFTWARE APPLICATION WHEREIN THE VISUAL CLUE IS VISUALLY ASSOCIATED WITH A VISUAL REPRESENTATION OF THE DATA.
306

UPON DETECTING A USER INTERACTION WITH THE VISUAL CLUE, CAUSE THE FIRST SOFTWARE APPLICATION TO DISPLAY A FIRST PORTION OF THE METADATA IN THE GRAPHICAL INTERFACE.
308

UPON DETECTING A USER INTERACTION WITH THE VISUAL CLUE, CAUSE THE FIRST SOFTWARE APPLICATION TO DISPLAY A LINK IN THE FIRST PORTION OF THE METADATA SUCH THAT UPON A SELECTION OF THE LINK FROM THE USER, A SECOND PORTION OF THE METADATA WILL BE DISPLAYED.
310

Fig. 3

Process
400

ASSOCIATIONS ARE RECEIVED AT A USER COMPUTER SYSTEM THAT RELATE DATA IN A FIRST DATABASE TO METADATA IN A SECOND DATABASE, WHEREIN THE DATA IS FOR USE IN A FIRST SOFTWARE APPLICATION.
402

A VISUAL CLUE IS DISPLAYED TO A USER IN A GRAPHICAL INTERFACE ASSOCIATED WITH THE FIRST SOFTWARE APPLICATION WHEREIN THE VISUAL CLUE IS VISUALLY ASSOCIATED WITH A VISUAL REPRESENTATION OF THE DATA.
404

A USER INTERACTION WITH THE VISUAL CLUE IS DETECTED.
406

IN RESPONSE TO THE DETECTING, A FIRST PORTION OF THE METADATA RELATED TO THE DATA IS DISPLAYED AND A LINK TO A SECOND PORTION OF THE METADATA IS DISPLAYED.
408

IN RESPONSE TO A SELECTION OF THE LINK, THE SECOND PORTION OF THE METADATA IS DISPLAYED.
410

Fig. 4

Process
500

ASSOCIATIONS ARE CREATED, AT A FIRST COMPUTER SYSTEM, THAT RELATE DATA IN A FIRST DATABASE TO METADATA IN A SECOND DATABASE.
502

THE ASSOCIATION ARE SYNDICATED AT THE COMPUTER SYSTEM TO A FIRST SOFTWARE APPLICATION ASSOCIATED WITH THE DATA.
504

THE SYNDICATING TO CAUSE THE FIRST SOFTWARE APPLICATION EXECUTING AT A SECOND COMPUTER SYSTEM TO DETECT A COMMAND FROM A USER TO ACCESS AT LEAST A PORTION OF THE DATA.
506

THE FIRST SOFTWARE APPLICATION FURTHER TO DETERMINE THAT THE AT LEAST THE PORTION OF THE DATA IS SENSITIVE DATA BASED ON THE ASSOCIATIONS AND THE METADATA.
508

THE FIRST SOFTWARE APPLICATION FURTHER TO NOTIFY THE USER THAT THE DATA IS SENSITIVE DATA IN A GRAPHICAL INTERFACE ASSOCIATED WITH THE FIRST SOFTWARE APPLICATION.
510

Fig. 5

SYNDICATION OF ASSOCIATIONS RELATING DATA AND METADATA

RELATED APPLICATIONS

This application claims priority to and is a continuation of the co-pending patent application having application Ser. No. 15/885,603, entitled "SYNDICATION OF ASSOCIATIONS RELATING DATA AND METADATA," with filing date Jan. 31, 2018, by James Pitts, et al., and assigned to the assignee of the present invention, the disclosure of which is hereby incorporated herein by reference in its entirety.

The application having application Ser. No. 15/885,603 claims priority to and is a continuation of then patent application having application Ser. No. 14/023,080, now U.S. Issued U.S. Pat. No. 9,916,289, entitled "SYNDICATION OF ASSOCIATIONS RELATING DATA AND METADATA," with filing date Sep. 10, 2013, by James Pitts, et al., and assigned to the assignee of the present invention, the disclosure of which is hereby incorporated herein by reference in its entirety.

FIELD OF THE TECHNOLOGY

The present technology relates generally to syndicating associations that relate data and metadata for use in software applications.

BACKGROUND

Many electronic devices use software. The software may make use of data in databases. Data is becoming increasingly prolific and uses are often inundated with too much data and information. In some instances data may not make logical sense to a user if presented out of context. Therefore a user may spend time, resources and energy in placing the data in context by actively searching for and obtaining secondary data that places the data in context. Such secondary data may not be readily available to a user accessing the data.

BRIEF DESCRIPTION OF DRAWINGS

FIG. 3 is flowchart for passively relating data to metadata in accordance with embodiments of the present technology.

FIG. 4 is flowchart for passively relating data to metadata in accordance with embodiments of the present technology.

FIG. 5 is flowchart for passively relating data to metadata in accordance with embodiments of the present technology.

Figure 1:
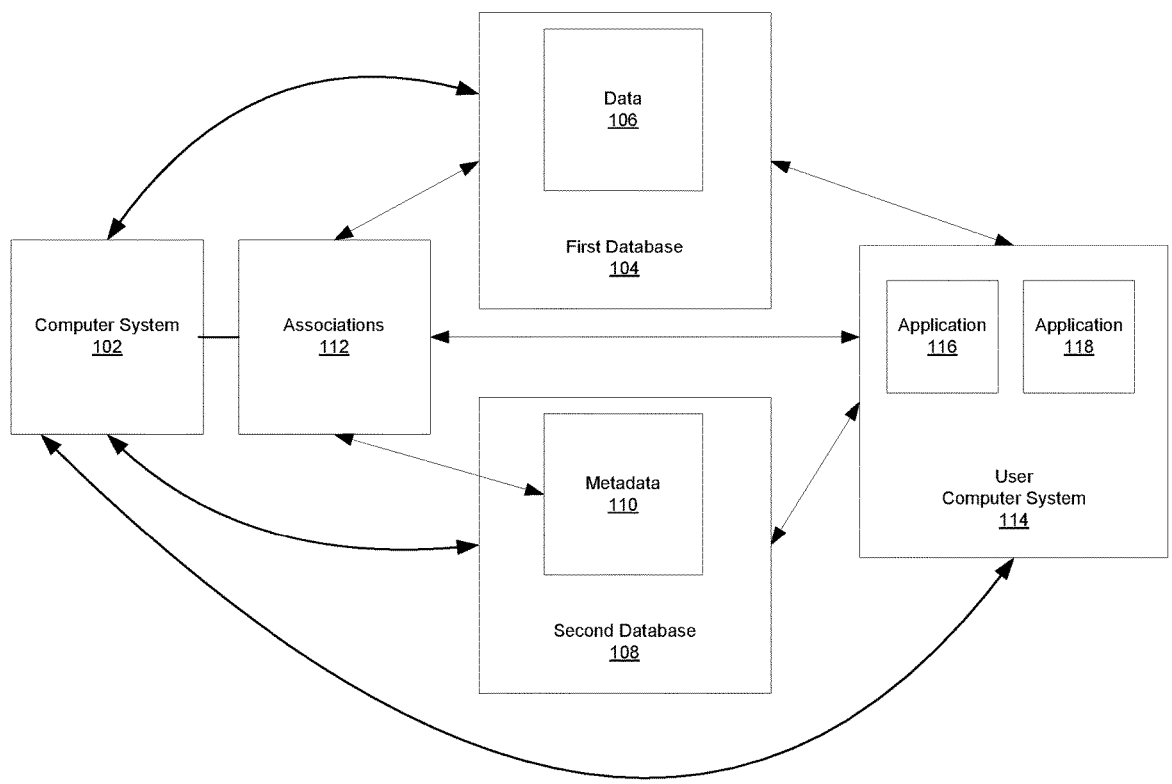
FIG. 1 is a block diagram of an environment for relating data to metadata in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, user interface controls, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "creating," "syndicating," "displaying," "executing," "detecting," "receiving," "determining," "notifying," "alerting," "warning," or the like, refer to the actions and processes of a computer system, or similar electronic computing device. The computer system or similar electronic computing device, such as a smart phone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Syndication of Associations Relating Data to Metadata

Users of computer systems receive vast amounts of data that may or may not make logical sense out of context. However, the user may benefit by receiving secondary data that places the data in context. Such a user may be a working a professional, a web surfer, a software developer, or any other type of computer user. Metadata may exist that gives context to the data and may be useful to user. However, if the user has actively to go and find the metadata, then time is wasted and the user may not be able to locate the metadata. Therefore the present technology passively creates associations between the data and metadata and then presents the user with visual clues in a graphical interface that the metadata is readily and immediately available. The user may then interact with the visual clue to display the metadata or a portion of the metadata. A link may also be displayed that will lead the user to more metadata to place the data into context or provide more information for the user. Thus the user is not required to actively seek the metadata. In one embodiment, the present technology is CONNECT by Embarcadero Technologies.

The associations that relate the data to the metadata may be created and then syndicated to a software application that is designed to provide access to the data and/or metadata. The data may be stored in a first database and the metadata in a second database. In one embodiment, the data is in a database managed by Structured Query Language (SQL) tool.

The present technology presents the metadata from a repository of information where the data is being used. In other words, the present technology is a passive search performed in the tool the user is using to access the data where the additional metadata related to the data becomes readily available. The additional metadata is readily available without requiring the user to actively seek the additional metadata. Using the present technology in the context of SQL provides the ability to link to a repository of metadata and present the additional information to the user.

Metadata about data storage generally includes things such as a data entity, data attributes, table descriptions, column descriptions, related attachments, and terms or domains. This technical information may be available in some documented forms and users interested in this metadata can look up the documentation and understand intent or description. This could be described as an active search of the metadata. The problem is the user needs to know where to find the information and often needs to search whether more information exists. The present technology operates to display the metadata in an interface where the data is being used. In other words, the present technology performs a passive search in the tool that the user is using to access the data. The results of the passive search are then made readily available to the user in the form of additional metadata and may provide a user with a link to more information and/or metadata.

In one embodiment, the metadata is presented to the user as a notification, warning, or alert regarding the access of the data. For example, the user may be accessing sensitive data such as identity data. The notification is then automatically generated and displayed to warn the user regarding the access of the sensitive information.

Syndication of Associations Relating Data to Metadata

Referring to the figures, exemplary embodiments of the technology will now be described. The following description will focus on an embodiment of the present technology, which is implemented using a device with an operating environment or platform such as an operating system. The present technology, however, is not limited to any one particular device, operating system, environment, or platform. Instead, those skilled in the art will find that the system and methods of the present technology may be advantageously embodied on a variety of different platforms, including Microsoft Windows, iOS, Android, Macintosh, Linux, Solaris, UNIX, FreeBSD, and the like. Therefore, the description of the exemplary embodiments that follows is for purposes of illustration and not limitation.

FIG. 1 is a block diagram illustrating environment 100 which is an example environment comprising computer system 102 and user computer system 114. It should be appreciated that computer system 102 and user computer system 114 may be a standard or customized computer system and may be a desktop, server, laptop, tablet, handheld or other computer system. Computer system 102 and user computer system 114 may be employed by a developer for use of the present technology. Computer system 102 and user computer system 114 comprises memory, processor(s), data storage and other standard components.

In one embodiment, computer system 102 has access to first database 104 and second database 108. It should be appreciated that first database 104 and second database 108 may or may not be relational databases and may or may not be programmed or managed by SQL and may be accessed via SQL tools. First database 104 and second database 108 may be stored at computer system 102, user computer system 114, a third party computer system, or any combination thereof. Moreover, first database 104 or second database 108 may refer to more than one database stored at more than one location. First database 104 comprises data 106. Data 106 is data or information that is for use by a user or software application. Second database 108 comprises metadata 110. Metadata 110 comprises information that relates to data 106 and places data 106 in context. In other words, metadata 110 provides additional information regarding data 106. Metadata 110 may be described as a repository of information and may comprise entities, attributes, columns, maps, charts, models, sub models, objects, descriptions, discussions, following, tables, and other data commonly organized in databases.

In one embodiment, computer system 102 creates associations 112 relating data 106 to metadata 110. The associations may also be described as a relations or relationships. The association ties data together, links data together, or points a tool to the metadata associated with the data. Once associations 112 are created, they may be stored at computer system 102 or other locations and may be used by software applications or tools that access and otherwise use data 106. The software applications or tools, such as application 116 and application 118, may execute on computer system 102, user computer system 114, or another computer system, or a combination thereof. In one embodiment, associations 112 are syndicated for use by a variety of software applications and/or tools. In one embodiment, associations 112 are employed by an SQL tool. The software application or tool, such as the SQL tool, is then able to parse and identify what is in data 106 and relates that back to the metadata in second database 108.

Application 116 and application 118 are shown in FIG. as executing on user computer system 114 but may also execute on computer system 102 or another computer system. Application 116 and application 118 are able to make use of the syndicated associations 112 that relate data 106 to metadata 110. Application 116 and application 118 may be web browser, word processors, spreadsheet software, database management software, wiki, web application, or other software applications. In one embodiment, application 116 and application 118 comprise graphic user interfaces that display data including data 106 and/or metadata 110. Therefore, application 116 and application 118 have access to first database 104 and second database 108. It should be appreciated that once associations 112 have been created they may be used by more than one type of software application. Additionally, different versions of associations 112 may be created to be used by different types of applications.

Figure 2A:
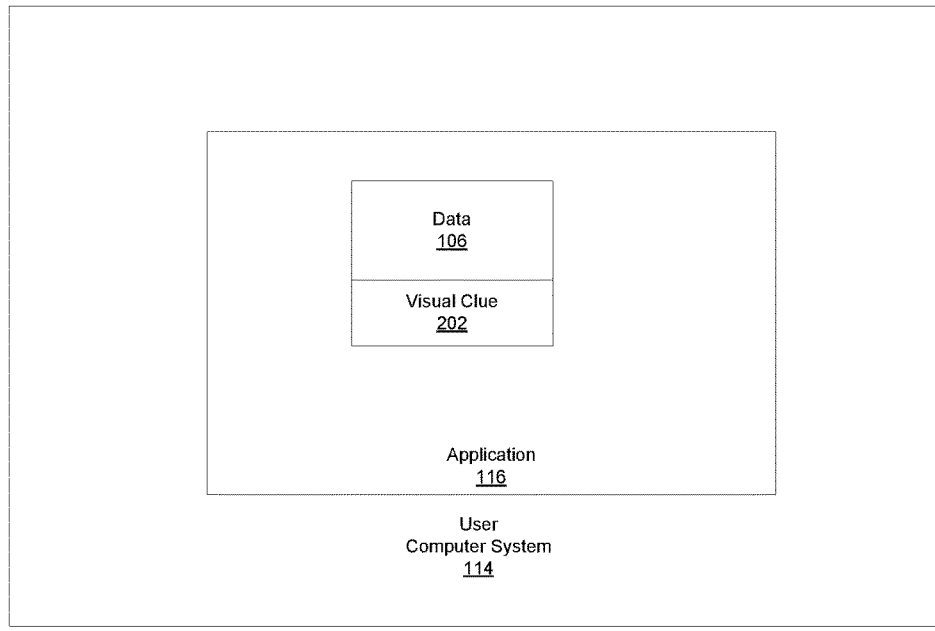
FIG. 2A is a block diagram of an environment for relating data to metadata in accordance with embodiments of the present technology.

FIG. 2A is a block diagram illustrating environment 200 which is an example environment comprising user computer system 114. It should be appreciated that user computer system 114 in FIG. 2A may also refer to computer system 102 or another computer system that has access to data 106, metadata and associations 112. In one embodiment, application 116 displays data 106 and visual clue 202 in a graphical interface. The graphical interface may be on a computer monitor, a touch screen, or other display. In one embodiment, visual clue 202 is displayed in a manner that associates visual clue 202 with data 106 in the graphical interface and provides some type of visual clue, symbol, or information to a user that more information or data regarding data 106. Visual clue 202 may be generated when application 116 access or displays data 106. Visual clue 202 is created based on associations 112 and metadata 110. For example, application 116 may be programmed to understand and use associations 112 or application 116 may be modified via plug-ins or other techniques to make use of associations 112 which are syndicated to application 116.

It should be appreciated that visual clue 202 may be displayed in a variety of forms using a variety of techniques. For example, data 106 may be text displayed in application 116 and visual clue 202 may be a line or a dotted line that underlines the text of data 106. Visual clue 202 may also highlight data 106 or change data 106 to a designated color. Visual clue 202 may also be some other form of button in the graphical display of application 116. In one embodiment, visual clue 202 is configured such that if it is interacted with or selected by a user, then the graphical interface of application 116 will display additional information such as a portion of the metadata.

Figure 2B:
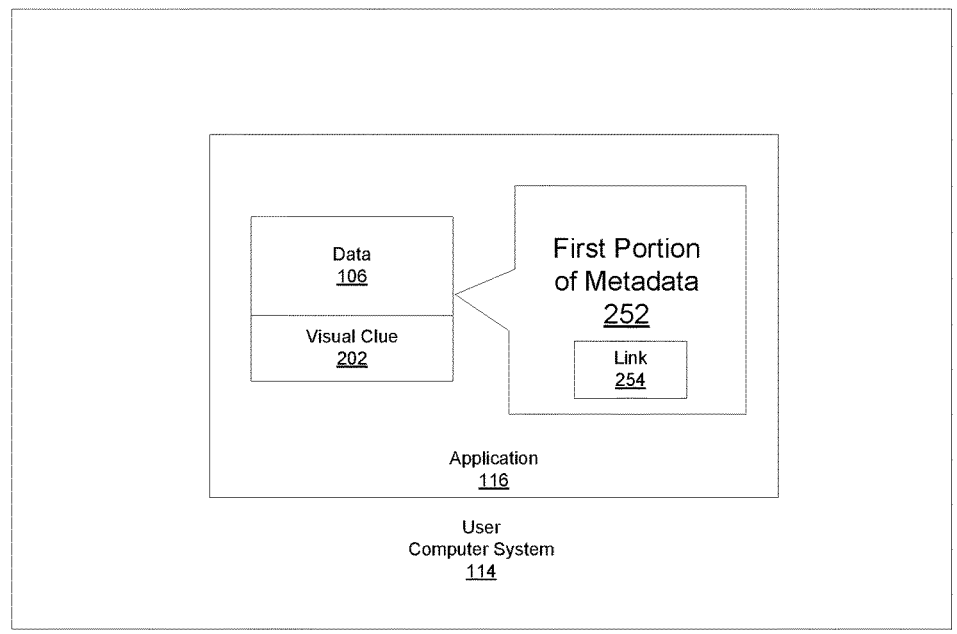
FIG. 2B is a block diagram of an environment for relating data to metadata in accordance with embodiments of the present technology.

FIG. 2B is a block diagram illustrating environment 250 which is an example environment comprising user computer system 114. It should be appreciated that user computer system 114 in FIG. 2B may also refer to computer system 102 or another computer system that has access to data 106, metadata and associations 112. In one embodiment, a user of user computer system 114 interacts with visual clue 202 and in response, the graphical display of application 116 displays first portion of metadata 252. First portion of metadata 252 displays at least a portion of metadata 110 and provides additional information to the user related to data 106. It should be appreciated that a user may interact with or select visual clue 202 in a variety of ways. For example, the user may use a mouse to click or double click on visual clue 202. In one embodiment, the user hovers a cursor in the graphical display over visual clue 202 for a predetermined amount of time. In one embodiment, the user employs a cursor to highlight the text or image of data 106 by clicking and dragging a mouse cursor over the text or image to be highlighted.

The act of a user interacting with visual clue 202 invokes the display of a portion of metadata 110 that may also be described as a passive search for additional information related to data 106. Such a passive search is carried out by the tool employed by the user and does not require specific knowledge on the part of the user. For example, the user may not even be aware that additional information is available. Instead the tool employs associations 112 to search for, find, and display the additional information.

In one embodiment, first portion of metadata 252 displays additional information regarding or relating to data 106 in the form of a pop up. For example, the pop up may be a region of the graphical display that overlaps other portions of the graphical display. The pop up may remain in the display until the user takes an action to remove the pop up. For example, the pop up may remain displayed so long as a cursor in the graphical interface hovers over visual clue 202 or the pop up itself. The user may also be required to click in a region outside of the pop up to make the pop disappear or click on an exit button in the pop up.

In one embodiment, first portion of metadata 252 comprises link 254. Link 254 may be a hyperlink that represents a uniform resource locator (URL) address or another type of address. Link 254 may be represented by a symbol or by the text of first portion of metadata 252. Upon selection of link 254 by a user, a second portion of metadata 110 may be displayed. In one embodiment, the second portion of metadata 110 is displayed in the graphical interface of application 116. In one embodiment, upon selection of link 254, the second portion of metadata 110 is displayed in a second application such as application 118. In other words, the selection of link 254 may launch application 118 and display the additional information. A user may select link 254 by clicking on it.

Figure 2C:
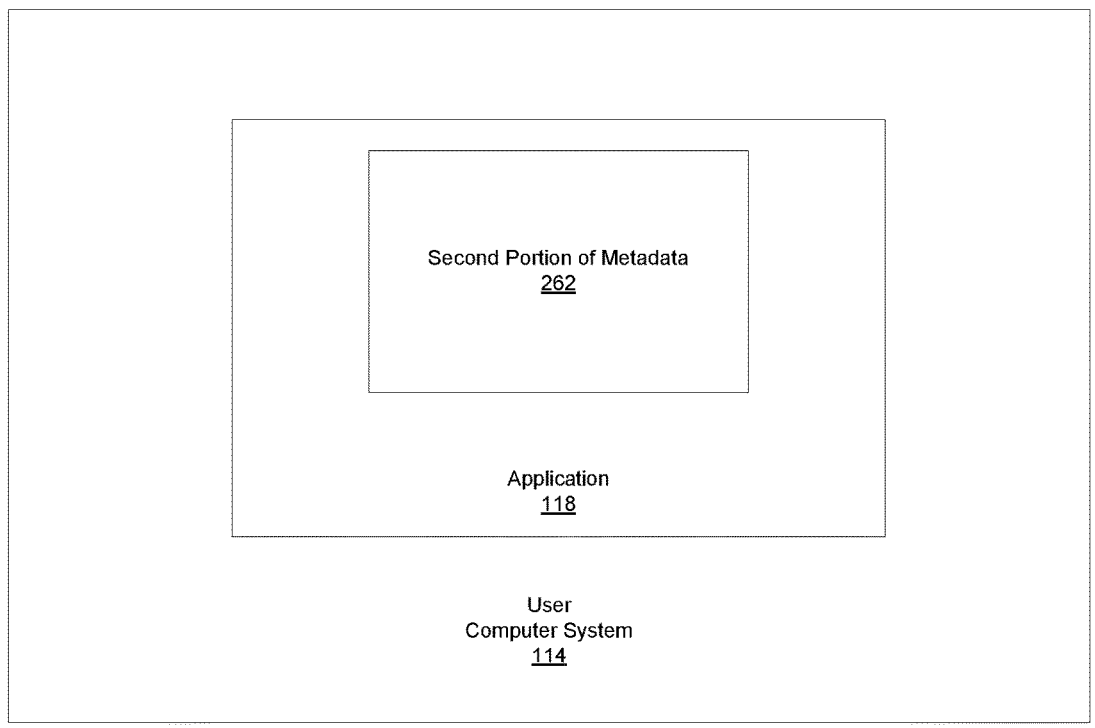
FIG. 2C is a block diagram of an environment for relating data to metadata in accordance with embodiments of the present technology.

FIG. 2C is a block diagram illustrating environment 260 which is an example environment comprising user computer system 114. It should be appreciated that user computer system 114 in FIG. 2C may also refer to computer system 102 or another computer system that has access to data 106, metadata and associations 112. In one embodiment, a user of application 116 has selected link 254 and launched application 118. Application 118 then displays second portion of metadata 262. Second portion of metadata 262 comprises additional information regarding or related to data 106. Second portion of metadata 262 of is at least a portion of metadata 110 and is associated with data 106 via associations 112. It should be appreciated that the second portion of metadata 262 need not be displayed in application 118 but could be displayed in application 116 or some other application.

In one embodiment, the second portion of metadata 262 comprises discussions and following of data 106. For example, data 106 may refer to a person such as an employee, entertainer, or professional or may refer to a place such as a restaurant or may refer to a thing such as a sales report, a consumer product, or a software application. Second portion of metadata 262 may then comprises feedback from users or people associated with the person, place or thing. The discussions and following may aid the user of second portion of metadata 262 in making decisions related to data 106. The feedback may also be described as social interactions. In one embodiment, the user of data 106 and application 116 may be able to add to metadata 110 to add their own feedback, discussions or following of data 106.

In one embodiment, data 106 is an error that is presented to a user who is using application 116. The error may be associated with additional information in the form of metadata and the present technology may have created associations between the error and the additional information. The error may have a visual clue such as visual clue 202 that when interacted with, will provide the user with the additional information about the error. The additional information may be provided using the techniques described regarding first portion of metadata 252 and second portion of metadata 262 herein.

In one embodiment, the present technology does not employ visual clues such as visual clue 202 but rather employs associations 112 to create warnings, alerts, or notifications automatically. For example a user may be developer that is accessing data 106 and may be employing tools to alter, change, or otherwise affect data 106. The developer may be developing software that will provide end users with access to data 106. The developer may be aided by the present technology by being given warnings about actions attempted by the developer. In one embodiment, data 106 may be sensitive data. Sensitive data may be identity data of real people such as names, addresses, contact information, credit or payment information, etc. Therefore, a developer may wish to be warned when the developer is taking an action that will alter data 106 or alter who has access to data 106. The present technology may employ associations 112 to determine that data 106 or a portion of data 106 is sensitive information and then detect with the developer is attempting to access data 106. At this point the present technology will then issue a warning, alert or notification automatically that the sensitive information is being accessed. The warning may then be used by the developer to make decisions. The warning may be a pop as described for first portion of metadata 252 and may have a link to additional information such as second portion of metadata 262.

In one embodiment, data 106 is replicated and stored in many places, is redundant data, or was stored elsewhere before it was stored in first database 104. In such an embodiment, it may be useful for a user to know the history of data 106 or to have a map or chart of where redundant copies of data 106 are stored and how many times it has been replicated. This information may be useful to a developer accessing data 106 to give a developer information regarding the scope of changes to data 106 that are being contemplated by data 106. Such histories, charts and maps may be metadata such as metadata 110 and may be displayed to a developer using techniques described for first portion of metadata 252 and second portion of metadata 262. Such histories, charts and maps may be described as an impact analysis of data 106. The impact analysis may be generated passively and/or automatically without a specific command from the developer.

Operations

FIG. 3 is a flowchart illustrating process 300 for passively relating data to metadata, in accordance with one embodiment of the present invention. In one embodiment, process 300 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 300 is performed by the devices, components, data, metadata, databases, applications, associations, and modules in FIGS. 1 and 2A-C.

At 302, associations are created, at a first computer system, that relate data in a first database to metadata in a second database. For example, computer system 102, data 106, first database 104, metadata 110, and second database 108 of FIG. 1 may be employed. The associations are relationships between the data and metadata where the metadata provides additional information about the data and places the data in context. In one embodiment, the associations are created passively, automatically, and without specific commands or directions from a user.

At 304, the associations are syndicated at the computer system to a first software application associated with the data. The first software application may be application 116 of FIG. 1. The first software application may also be an SQL tool.

At 306, the syndicating to cause the first software application executing at a second computer system to display a visual clue to a user in a graphical interface associated with the first software application wherein the visual clue is visually associated with a visual representation of the data. The second computer system may be user computer system 114 or may be the same computer system as the first computer system. The visual clue may be visual clue 202 of FIG. 1.

At 308, upon detecting a user interaction with the visual clue, cause the first software application to display a first portion of the metadata in the graphical interface. The first portion of metadata may be first portion of metadata 252 of FIG. 1. The user interaction may be a cursor hover, a click, a double click, or a highlight of the visual clue or of the data itself. In one embodiment, the data is an error and the metadata is additional information regarding the error. In one embodiment, the data is, at least in part, sensitive information and the metadata is a warning or notification that sensitive information is being accessed. In one embodiment, the metadata is an impact analysis regarding the access of the data. In one embodiment, the metadata is social feedback from other users regarding the data such as discussions, following, and descriptions. In one embodiment, the first portion of metadata is displayed as a pop up in the graphical interface.

At 310, upon detecting a user interaction with the visual clue, cause the first software application to display a link in the first portion of the metadata such that upon a selection of the link from the user, a second portion of the metadata will be displayed. Link 254 and second portion of metadata 262 of FIG. 1 may be employed.

FIG. 4 is a flowchart illustrating process 400 for passively relating data to metadata, in accordance with one embodiment of the present invention. In one embodiment, process 400 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 400 is performed by the devices, components, data, metadata, databases, applications, associations, and modules in FIGS. 1 and 2A-C.

At 402, associations are created, at a user computer system, that relate data in a first database to metadata in a second database. For example, computer system 102, data 106, first database 104, metadata 110, and second database 108 of FIG. 1 may be employed. The associations are relationships between the data and metadata where the metadata provides additional information about the data and places the data in context. In one embodiment, the associations are created passively, automatically, and without specific commands or directions from a user.

At 404, a visual clue is displayed to a user in a graphical interface associated with the first software application wherein the visual clue is visually associated with a visual representation of the data. The visual clue may be visual clue 202 of FIG. 1 and the first software application may be application 116.

At 406, a user interaction with the visual clue is detected. The user computer system may detect the interaction and it may be a mouse hover, a click or another interaction with the visual clue.

At 408, in response to the detecting, a first portion of the metadata related to the data is displayed and a link to a second portion of the metadata is displayed. For example this may be first portion of metadata 252, link 254 and second portion of metadata 262 of FIG. 1.

At 410, in response to a selection of the link, the second portion of the metadata is displayed. This may be second portion of metadata 262 of FIG. 1.

FIG. 5 is a flowchart illustrating process 500 for passively relating data to metadata, in accordance with one embodiment of the present invention. In one embodiment, process 500 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 500 is performed by the devices, components, data, metadata, databases, applications, associations, and modules in FIGS. 1 and 2A-C.

At 302, associations are created, at a first computer system, that relate data in a first database to metadata in a second database. For example, computer system 102, data 106, first database 104, metadata 110, and second database 108 of FIG. 1 may be employed. The associations are relationships between the data and metadata where the metadata provides additional information about the data and places the data in context. In one embodiment, the associations are created passively, automatically, and without specific commands or directions from a user.

At 504, the association are syndicated at the computer system to a first software application associated with the data. The first software application may be application 116 of FIG. 1. The first software application may also be an SQL tool.

At 506, the syndicating to cause the first software application executing at a second computer system to detect a command from a user to access at least a portion of the data. The second computer system may be user computer system 114 of FIG. 1 which may also accomplish the detecting.

At 508, the first software application further to determine that the at least the portion of the data is sensitive data based on the associations and the metadata. The sensitive data may be identity data.

At 510, the first software application further to notify the user that the data is sensitive data in a graphical interface associated with the first software application. Such a notification may be a warning or alert that is generated automatically without requiring a request or an interaction from the user for additional information.

While the technology is described in some detail with specific reference to embodiments and alternatives, there is no intent to limit the technology to a particular embodiment or specific alternatives. For instance, those skilled in the art will appreciate that modifications may be made to embodiments without departing from the teachings of the present technology.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as computer system 101 and/or device 112 of FIG. 1. Described below is an example computer system or components that may be used for or in conjunction with aspects of the present technology such as the ability to run or create a three dimensional interface.

It is appreciated that that the present technology can operate on or within a number of different computer systems including general purpose networked computer systems, embedded computer systems, a personal computer such as a desktop computer, a laptop, a notebook, an electronic handheld device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for passively relating data to metadata, said method comprising:

creating associations, at a first computer system, that relate data in a first database to metadata in a second database, wherein an association links said data to said metadata, wherein said data is managed by a software application at a second computer system, wherein said creating said associations occurs automatically without user interaction;

syndicating said associations at said first computer system to said software application at said second computer system associated with said data;

displaying a visual clue in a graphical interface of said software application at said second computer system, wherein said visual clue corresponds to a visual representation of said data, and wherein said visual clue is created based on said metadata and said associations; and upon detecting a user interaction with said visual clue:

searching for said metadata corresponding to said visual clue based on said associations of said visual clue;

displaying at least a first portion of said metadata in said graphical interface; and displaying a selectable link in said first portion of said metadata.

2. The method as recited in claim 1, further comprising:
upon selection of said selectable link, displaying a second portion of said metadata in said graphical interface.

3. The method as recited in claim 1, further comprising:
upon selection of said selectable link, executing a second software application for displaying a second portion of said metadata.

4. The method as recited in claim 1, wherein said user interaction is selected from the group of user interactions consisting of: hovering a cursor over said visual clue, using a cursor to select said visual clue, and using a mouse click to select said visual clue.

5. The method as recited in claim 1, wherein said data is an error message for an error and said metadata comprises details regarding said error.

6. The method as recited in claim 1, wherein said data comprises sensitive data and said metadata comprises a warning to said user that said sensitive data is being accessed.

7. The method as recited in claim 1, wherein said data is in redundant use in more than one location and said metadata comprises an impact analysis regarding said redundant use.

8. The method as recited in claim 1, wherein said displaying said at least a first portion of said metadata comprises:

displaying said at least a first portion of said metadata in a pop up region in said graphical interface that overlaps other portions of said graphical interface.

9. A non-transitory computer-usable storage medium having instructions embodied therein that when executed cause a computer system to perform a method for passively relating data to metadata, said method comprising:

creating associations, at a first computer system, that relate data in a first database to metadata in a second database, wherein an association links said data to said metadata, wherein said data is managed by a software application at a second computer system, wherein said creating said associations occurs automatically without user interaction;

syndicating said associations at said first computer system to said software application at said second computer system associated with said data;

displaying a visual clue in a graphical interface of said software application at said second computer system, wherein said visual clue corresponds to a visual representation of said data, and wherein said visual clue is created based on said metadata and said associations; and upon detecting a user interaction with said visual clue:

searching for said metadata corresponding to said visual clue based on said associations of said visual clue;

displaying at least a first portion of said metadata in said graphical interface; and displaying a selectable link in said first portion of said metadata.

10. The non-transitory computer-usable storage medium as recited in 9, said method further comprising:
upon selection of said selectable link, displaying a second portion of said metadata in said graphical interface.

11. The non-transitory computer-usable storage medium as recited in 9, said method further comprising:
upon selection of said selectable link, executing a second software application for displaying a second portion of said metadata.

12. The non-transitory computer-usable storage medium as recited in 9, wherein said user interaction is selected from the group of user interactions consisting of: hovering a cursor over said visual clue, using a cursor to select said visual clue, and using a mouse click to select said visual clue.

13. The non-transitory computer-usable storage medium as recited in 9, wherein said data is an error message for an error and said metadata comprises details regarding said error.

14. The non-transitory computer-usable storage medium as recited in 9, wherein said data comprises sensitive data and said metadata comprises a warning to said user that said sensitive data is being accessed.

15. The non-transitory computer-usable storage medium as recited in 9, wherein said data is in redundant use in more than one location and said metadata comprises an impact analysis regarding said redundant use.

16. The non-transitory computer-usable storage medium as recited in 9, wherein said displaying said at least a first portion of said metadata comprises:

displaying said at least a first portion of said metadata in a pop up region in said graphical interface that overlaps other portions of said graphical interface.

* * * * *